I. A. STOCKWELL.
WASHER.
APPLICATION FILED SEPT. 19, 1918.
1,314,990.
Patented Sept. 2, 1919.
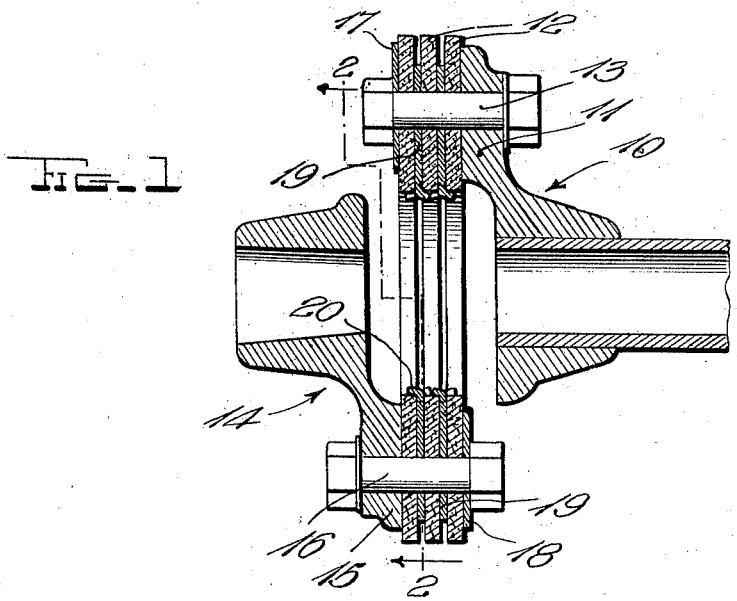
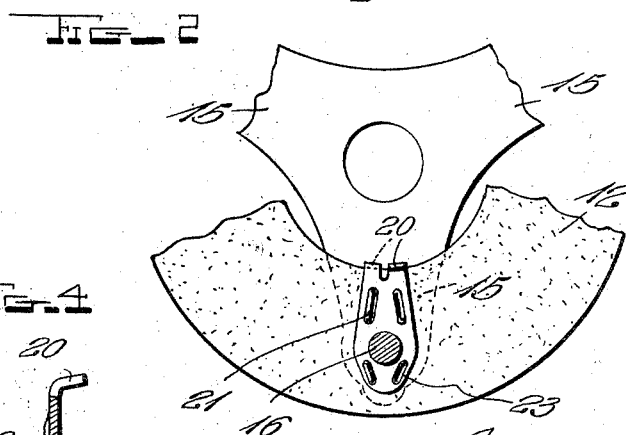
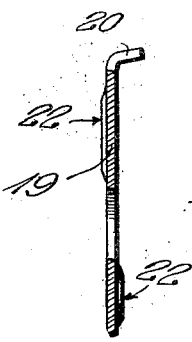
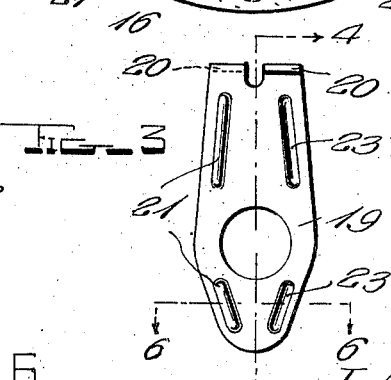
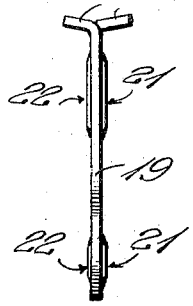
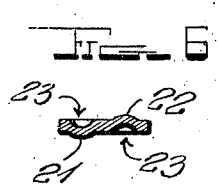
Inventor
I. A. Stockwell
By Norman T. Whitaker
his Attorney

UNITED STATES PATENT OFFICE.

IVAN A. STOCKWELL, OF NORWALK, OHIO, ASSIGNOR TO THE NORWALK AUTO PARTS COMPANY, OF NORWALK, OHIO, A CORPORATION OF OHIO.

WASHER.

1,314,990.     Specification of Letters Patent.     Patented Sept. 2, 1919.

Application filed September 19, 1918. Serial No. 254,708.

*To all whom it may concern:*

Be it known that I, IVAN A. STOCKWELL, a citizen of the United States, and a resident of Norwalk, in the county of Huron and State of Ohio, have invented new and useful Improvements in Washers, of which the following is a specification.

This invention relates to washers and has particular reference to that class of washers employed as spacing means for flexible rings used in the construction of flexible shaft couplings.

An important object of the invention is to provide in a device of the above mentioned character a means whereby the washer as a whole may be securely held in place under varying conditions.

A further object is to provide a device of the above mentioned character which is simple in construction and inexpensive to manufacture.

Other objects and advantages of the invention will be apparent during the course of the following description.

In the accompanying drawings forming a part of this specification and in which like numerals are employed to designate like parts throughout the same.

Figure 1 is a central vertical longitudinal sectional view of a coupling embodying my invention.

Fig. 2 is a vertical section taken on line 2—2 of Fig. 1,

Fig. 3 is face view of a washer,

Fig. 4 is a vertical section taken on the line 4—4 of Fig. 3,

Fig. 5 is an edge view of the same, and,

Fig. 6 is a detail horizontal section taken on the line 6—6 of Fig. 3.

In the drawings wherein for the purpose of illustration is shown a preferred form of my invention the numeral 10 indicates a coupling member comprising a plurality of radially extending arms 11 to which are secured a plurality of flexible rings 12 by means of a bolt 13 passed therethrough as shown. The numeral 14 indicates as a whole a coupling member similar to that indicated by the numeral 10 which member comprises a plurality of radially extending arms 15 to which are secured by means of bolts 16, flexible rings 12. The bolts 13 and 16 carry, between the heads thereof and the adjacent flexible ring, washers 17 and 18, respectively. Between each of the flexible rings 12 there is disposed an elongated washer 19 provided at one end thereof with a pair of tongues 20 which are bent angularly with respect to the main body of the washer and oppositely with respect to each other. Upon one face of the washer 19 there is provided a plurality of ribs 21 which are struck therefrom to form a corresponding number of grooves upon the opposite side of the face. Upon the other face of the washer there is provided a plurality of ribs 22 similar to those indicated by the numeral 21. The ribs are struck from the washer to form upon the opposite side thereof the corresponding number of grooves 23.

In assembling the device the flexible rings 12, carrying therebetween the elongated washers 19, are placed in position as shown in Fig. 1. Bolts 13 and 16, carrying washers 17 and 18, respectively, are then passed through the flexible rings 12, the washers 19, and the arms 11 and 15, respectively. The nuts carried by these bolts are then run down upon the same thereby clamping the disks securely in place and embedding the tongues 20 of the washers 19 into the adjacent rings as clearly shown in Fig. 1. By provided these peculiarly designed washers the strain of rotation set up within the coupling as a whole is more evenly distributed throughout the flexible washers than would otherwise be possible and the tongues 20 embedded as they are serve to maintain the washers in the desired positions with respect to the flexible rings.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim as new and desire to secure and protect by Letters Patent of the United States, is:

1. The combination with a flexible coupling comprising coupling members, and flexible rings disposed therebetween; of means for spacing said rings, said means comprising elongated washers provided with tongues bent angularly with respect to the main body of the washer.

2. The combination with a flexible coupling comprising coupling members, and flexible rings disposed therebetween; of means for spacing said rings, said means comprising elongated washers provided with a pair of tongues bent angularly with respect to the main body of the washer and oppositely with respect to each other.

3. The combination with a flexible coupling comprising coupling members, flexible rings disposed therebetween; of means for spacing said rings, said means comprising washers having a plurality of ribs struck therefrom; a plurality of tongues carried by said washer, said tongues being arranged angularly with respect to the main body of the washer.

4. The combination with a flexible coupling comprising coupling members, flexible rings disposed therebetween; of means for spacing said rings, said means comprising washers having a plurality of ribs struck therefrom; a plurality of tongues carried by said washer, said tongues being bent angularly with respect to the main body of the washer and oppositely with respect to each other.

IVAN A. STOCKWELL.